(12) United States Patent
Castellanos et al.

(10) Patent No.: US 9,411,860 B2
(45) Date of Patent: Aug. 9, 2016

(54) CAPTURING INTENTIONS WITHIN ONLINE TEXT

(75) Inventors: Maria G. Castellanos, Sunnyvale, CA (US); Riddhiman Ghosh, Sunnyvale, CA (US); Mohamed E. Dekhil, Santa Clara, CA (US); Umeshwar Dayal, Saratoga, CA (US); Meichun Hsu, Los Altos Hills, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 212 days.

(21) Appl. No.: 14/003,140

(22) PCT Filed: Jun. 28, 2011

(86) PCT No.: PCT/US2011/042218
§ 371 (c)(1),
(2), (4) Date: Sep. 4, 2013

(87) PCT Pub. No.: WO2013/002771
PCT Pub. Date: Jan. 3, 2013

(65) Prior Publication Data
US 2014/0108455 A1    Apr. 17, 2014

(51) Int. Cl.
*G06F 17/30* (2006.01)
*G06Q 30/02* (2012.01)

(52) U.S. Cl.
CPC .......... *G06F 17/30539* (2013.01); *G06Q 30/02* (2013.01)

(58) Field of Classification Search
CPC ................................................ G06F 17/30539
USPC ............................................ 707/776; 704/9
See application file for complete search history.

(56) References Cited

U.S. PATENT DOCUMENTS

| 6,505,167 | B1 | 1/2003 | Horvitz et al. |
| 6,665,661 | B1 | 12/2003 | Crow et al. |
| 7,720,835 | B2 | 5/2010 | Ward et al. |

(Continued)

FOREIGN PATENT DOCUMENTS

| JP | 2002140346 A | 5/2002 |
| JP | 2004-078540 | 3/2004 |

(Continued)

OTHER PUBLICATIONS

Bing Liu et al., Opinion Observer: Analyzing and Comparing Opinions on the Web, ACM, May 10-14, 2005, 342-351.*

(Continued)

*Primary Examiner* — Jean B Fleurantin
(74) *Attorney, Agent, or Firm* — Fabian VanCott (57) ABSTRACT

A method of capturing intentions within online text comprises with a data mining device (105), identifying (block 305) a number of statements of intention within an online forum (110), and with the data mining device (105), extracting (block 310) a number of attributes (240, 245, 250, 255, 260) from the statements of intention. A system (100) for extracting intentions expressed within an online forum comprises a data mining device (105), a forum server (115) comprising a number of online forums (110) communicatively coupled to the data mining device (105), in which the data mining device identifies a number of statements of intention within the online forums (110) and extracts a number of attributes (240, 245, 250, 255, 260) from the statements of intention.

14 Claims, 5 Drawing Sheets

(56) References Cited

U.S. PATENT DOCUMENTS

| | | | |
|---|---|---|---|
| 7,756,755 B2 | 7/2010 | Ghosh et al. | |
| 8,612,432 B2 | 12/2013 | Kenthapadi et al. | |
| 9,304,984 B2* | 4/2016 | Castellanos et al. | 704/9 |
| 2004/0098275 A1* | 5/2004 | Hubert | 705/1 |
| 2004/0098280 A1* | 5/2004 | Hubert | 705/1 |
| 2004/0205643 A1 | 10/2004 | Harrington | |
| 2005/0165607 A1 | 7/2005 | Di Fabbrizio et al. | |
| 2007/0043770 A1 | 2/2007 | Goodrich et al. | |
| 2007/0118514 A1* | 5/2007 | Mariappan | 707/3 |
| 2007/0282826 A1 | 12/2007 | Hoeber et al. | |
| 2008/0104061 A1 | 5/2008 | Rezaei | |
| 2008/0215543 A1 | 9/2008 | Huang et al. | |
| 2010/0049538 A1 | 2/2010 | Frazer et al. | |
| 2010/0262610 A1* | 10/2010 | Acosta et al. | 707/748 |
| 2011/0029636 A1 | 2/2011 | Smyth et al. | |
| 2011/0153654 A1 | 6/2011 | Lee | |
| 2011/0225115 A1 | 9/2011 | Moitra et al. | |
| 2011/0238409 A1 | 9/2011 | Larcheveque et al. | |
| 2011/0295694 A1 | 12/2011 | Coggeshall et al. | |
| 2011/0302124 A1 | 12/2011 | Cai et al. | |
| 2011/0302162 A1 | 12/2011 | Xiao et al. | |
| 2012/0089642 A1 | 4/2012 | Milward et al. | |
| 2012/0253791 A1 | 10/2012 | Heck | |
| 2013/0253907 A1* | 9/2013 | Castellanos et al. | 704/9 |

FOREIGN PATENT DOCUMENTS

| | | |
|---|---|---|
| JP | 2004334602 A | 11/2004 |
| JP | 2010122823 A | 6/2010 |
| JP | 2010224813 A | 10/2010 |
| KR | 10-2004-0087535 | 10/2004 |
| KR | 10-2005-0061369 | 6/2005 |
| KR | 10-2011-0070057 | 6/2011 |

OTHER PUBLICATIONS

Guo, Yi, et al.; "Implicit Customer Relations Mining with the Event-indexing Model"; Jun. 6-7, 2009; 4 pages.

Kroll, Mark, et al.; "Analyzing Human Intentions in Natural Language Text"; Sep. 1-4, 2009; pp. 197-198.

Song, Insu, et al.; "Intention Extraction from Text Messages"; 2010; pp. 330-337.

Castellanos, Malu, et al. "Intention insider: discovering people's intentions in the social channel." Proceedings of the 15th International Conference on Extending Database Technology. ACM, 2012.

Dayong Wu; Yu Zhang; Shiqi Zhao; Ting Liu, "Identification of Web Query Intent Based on Query Text and Web Knowledge," Pervasive Computing Signal Processing and Applications (PCS PA), 201 O First International Conference on , vol., no., pp. 128,131, Sep. 17-19, 2010.

Jeanquartier, Fleur, Mark Kroll, and Markus Strohmaler. "Intent Tag Clouds: An Intentional Approach to Visual Text Analysis." (2009).

Yin, Xiaoxin, and Sarthak Shah. "Building taxonomy of web search intents for name entity queries." Proceedings of the 19th international conference on World wide web. ACM, 2010.

Notice of Allowance dated Jan. 7; 2016; issued in U.S. Appl. No. 13/429,741; 13 pages.

\* cited by examiner

CAPTURING INTENTIONS WITHIN ONLINE TEXT

BACKGROUND OF THE INVENTION

With the increase in social networking websites, forums, blogs, and similar Internet websites, authors who write within these forums are more and more willing to share information regarding their intentions for future activities. These authors even post events in which they are currently participating so that others may be informed of their current status. In one example, authors may share their intentions regarding a vacation they plan on taking. In this example, the author may share this intention with others for various reasons including to solicit advice from others who may read the posting and are able to assist the author in realizing his or her intention.

Even though these authors share their intentions on a regular or semi-regular basis, this information is not useful as a source of economic gain, for example, unless the information can be extracted in some way that is useful to an entity or third party that seeks to utilize the information for an economic purpose. In the above example, if the author expresses an intention to take a vacation, a travel agency, for example, would be left to manually comb through the various websites to ascertain the intention of the author to take the vacation and exploit that intention for an economic purpose. Manually extracting an author's intentions within the text of online statements is time consuming and is not economically beneficial.

SUMMARY OF THE INVENTION

A method of capturing intentions within online text is disclosed, where the method includes utilizing a data mining device to identify, via a processor, a plurality of statements of intention within an online forum, where each statement of intention is a statement by an author in the online forum, and where the statement is indicative of an intent to perform an action. As used herein, the identifying includes populating a list of seed patterns of the statements of intention, detecting a plurality of sentences within the online forum, dividing the sentences into a plurality of tokens for each sentence detected within the online forum, assigning each of the tokens a part of speech, and detecting a plurality of statements of intention using the list of seed patterns. The method further includes utilizing the data mining device to extract, via the processor, a plurality of attributes from the statements of intention.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

The present system and method describe capturing authors' intentions within online text. The text within online forums contains valuable information that, once analyzed, may be utilized within commerce to provide better products and services to consumers, enhance customer relations, create personalized target marketing, and, in general, capitalize on an understanding of consumers' intentions. Knowing consumer intentions allows for a company to remain competitive or obtain a competitive edge within commerce. However, with the incalculable amount of online text available for data mining within the innumerable online forums, a business entity would find it impossible to process online text in search for statements of intention. It would be too expensive for a business entity to create a team of people for scanning this online text to extract people's intentions. Further, the pace at which this intention extraction could be performed manually could not be performed at the pace at which the streams of messages are created, and the online text would become "stale" in that the statements of intention would quickly become outdated.

As used in the present specification and in the appended claims, the term "online text" is meant to be understood broadly as any text written on a forum located or accessed via a computer network or individual computing device. Further, as used in the present specification and in the appended claims, the term "online forum" is meant to be understood broadly as any forum in which online text may be presented. Some examples of online forums include social networking websites, blogging websites, message boards, web feeds, chat rooms, bulletin board systems, or a blog-publishing service, among others. Some specific examples of online forums include, FACEBOOK®, MYSPACE™, really simple syndication (RSS) web feeds from various websites, and message boards located on various websites, among others.

Further, as used in the present specification and in the appended claims, the term "author" or similar language is meant to be understood broadly as any person who is the source of some form of literary work. In one example, an author is a person who composes a literary work intended for publication on an online forum. Further still, as used in the present specification and in the appended claims, the term "data mining" is meant to be understood broadly as any process of collecting data from online text. In one example, data mining may include collecting business information from a data warehouse, correlating the information, and uncovering associations, patterns, and trends. In another example, data mining may include the process of analyzing a collection of online text for author intentions that are indicative of a potential economic opportunity.

Further, as used in the present specification and in the appended claims, the term "online analytical processing," "OLAP," or similar language is meant to be understood broadly as any process of collecting data from a number of sources, transforming and analyzing the consolidated data, and examining the results across different dimensions of the data by looking for patterns, trends, and exceptions within complex relationships of that data. OLAP may be applied in, for example, business reporting for sales, marketing, management reporting, business process management (BPM), budgeting and forecasting, and financial reporting, among others in bringing about an economic gain to a person who wishes to utilize that data in this manner, or for any other purpose.

Even still further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 1:
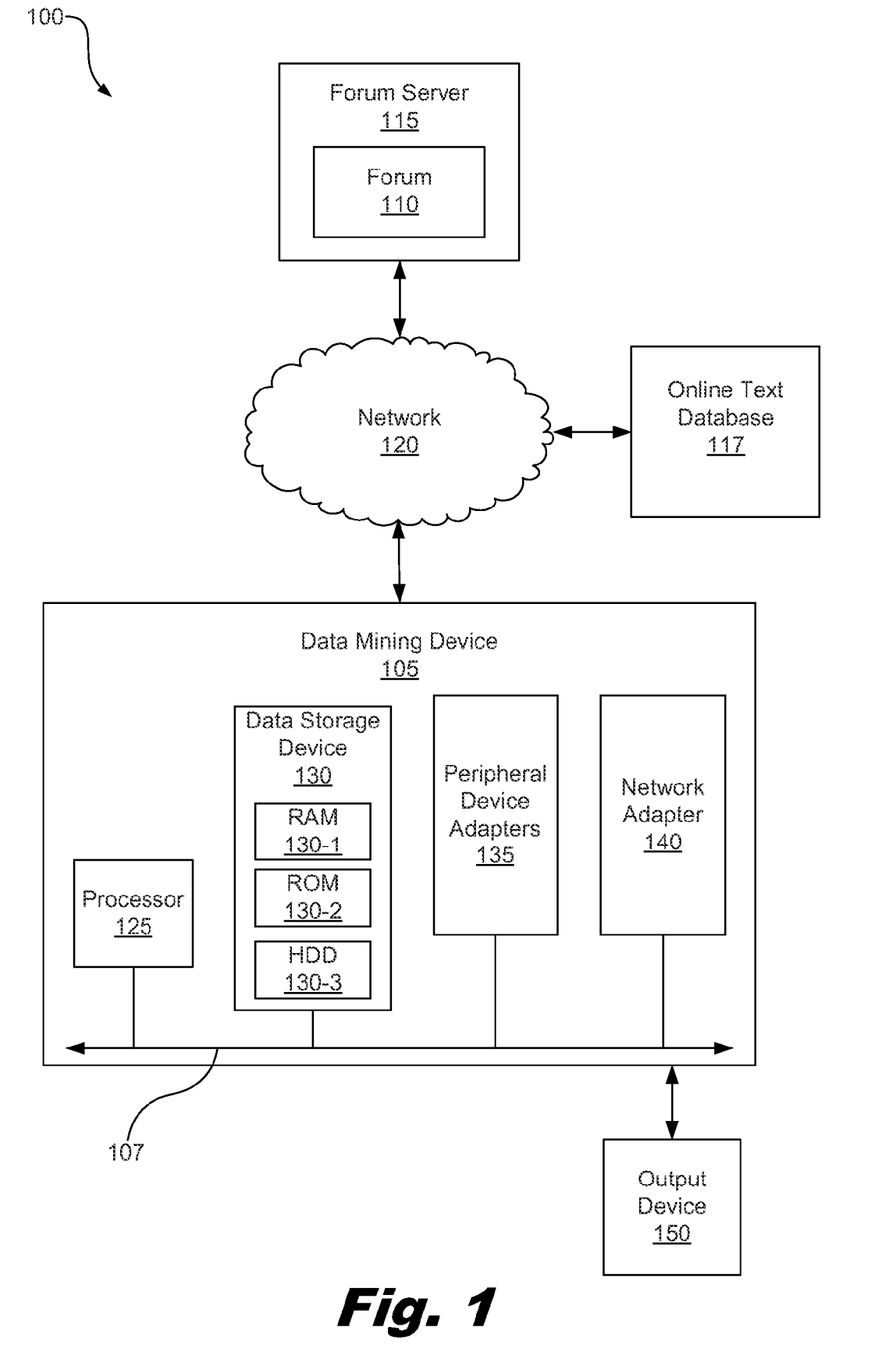
FIG. 1 is a diagram of a system for capturing intentions within online text, according to one example of the principles described herein.

Referring now to FIG. 1, a diagram of a system (100) for capturing intentions within online text, according to one example of the principles described herein, is depicted. The system (100) includes a data mining device (105) that has access to a forum (110) stored by a forum server (115), and an online text database (117). In the present example, for the purposes of simplicity in illustration, the data mining device (105), the forum server (115), and the online text database (117) are separate computing devices communicatively coupled to each other through a mutual connection to a network (120). However, the principles set forth in the present specification extend equally to any alternative configuration in which a data mining device (105) has complete access to the forum (110) and the online text database (117). As such, alternative examples within the scope of the principles of the present specification include, but are not limited to, examples in which the data mining device (105), forum server (115), and the online text database (117) are implemented by the same computing device, examples in which the functionality of the data mining device (105) is implemented by multiple interconnected computers, for example, a server in a data center and a user's client machine, examples in which the data mining device (105), the forum server (115), and the online text database (117) communicate directly through a bus without intermediary network devices, and examples in which the data mining device (105) has a stored local copy of the forum (110) or the online text database (117) that are analyzed to capture author's intentions.

The data mining device (105) of the present example is a computing device that retrieves data associated with the forum (110) hosted by the forum server (115), and the online text database (117). The data mining device (105) further creates an application for the capture of intentions within the online text of the forum (110) and text stored in the online text database, and presents the intentions of the authors of the text to a user for processing, printing, viewing, archiving, or any other useful purpose via the application. In one example, the data mining device (105) is a desktop computer with the capability of creating such an application, and displaying the captured intentions on an output device of the desktop computer.

In another example, the data mining device (105) is a mobile computing device such as a mobile phone, personal digital assistant (PDA), or a laptop computer with the capability of creating such an application, and displaying the captured intentions on a display device of the mobile computing device. In the above examples of the data mining device (105), the captured intentions may be transmitted to another device for further processing and analysis, stored in memory such as the data storage device (130), or viewed and analyzed at the data mining device (105) directly.

In yet another example, the data mining device (105) is a web crawler that explores the network (120) including, for example, the forum server (115) and the online text database, and retrieves portions of text. In this example, the web crawler is a combination of hardware and software that performs at least the functionality of capturing statements of intention and extracting attributes from the statements of intention upon execution of the application according to the methods of the present specification described below.

Thus, the data mining device (105) may capture and save intentions of authors of text within the forum (110) and online text database (117), and determine how the captured intentions provide an economic advantage. In the present example, this is accomplished by the data mining device (105) extracting intention verbs, action verbs, intention objects, and other attributes of the statements of intention contained within the text of the forum (110) of the forum server (115), and the online text database (117). In one example, the data mining device (105) uses the appropriate network protocol (e.g., Internet Protocol ("IP")) to communicate with the forum server (115) and the online text database (117) over the network (120). Illustrative processes for capturing statements of intention and extracting attributes from the statements of intention are set forth in more detail below.

To achieve its desired functionality, the data mining device (105) includes various hardware components. Among these hardware components are a processor (125), a data storage device (130), peripheral device adapters (135), and a network adapter (140). These hardware components may be interconnected through the use of a number of busses and/or network connections. In one example, the processor (125), data storage device (130), peripheral device adapters (135), and a network adapter (140) are communicatively coupled via bus (107).

The processor (125) includes the hardware architecture that retrieves executable code from the data storage device (130) and executes the executable code. The executable code, when executed by the processor (125), causes the processor (125) to implement at least the functionality of capturing statements of intention and extracting attributes from the statements of intention upon execution of the application according to the methods of the present specification described below. In the course of executing code, the processor (125) may receive input from and provide output to a number of the remaining hardware units.

The data storage device (130) may store data such as data regarding the intentions of an author of text that is processed and produced by the processor (125) or other processing device. The data storage device (130) specifically saves data associated with the author's text including, for example, a forum's Uniform Resource Locator (URL), the URL of the author's text, an author's name, address, or other identifying information, statements of intention found within the forum, attributes from the statements of intention, and others portions of text within the forum an author has written. All of this data is stored in the form of a database for easy retrieval and analysis.

The data storage device (130) includes various types of memory modules, including volatile and nonvolatile memory. For example, the data storage device (130) of the present example includes Random Access Memory (RAM) (130-1), Read Only Memory (ROM) (130-2), and Hard Disk Drive (HDD) memory (130-3). Many other types of memory are available in the art, and the present specification contemplates the use of many varying type(s) of memory (130) in the data storage device (130) as may suit a particular application of the principles described herein. In certain examples, different types of memory in the data storage device (130) are used for different data storage needs. For example, in certain examples the processor (125) may boot from Read Only Memory (ROM) (130-2), maintain nonvolatile storage in the Hard Disk Drive (HDD) memory (130-3), and execute program code stored in Random Access Memory (RAM) (130-1).

Generally, the data storage device (130) may comprise a computer readable storage medium. For example, the data storage device (130) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this specification, a computer readable storage medium may be any tangible medium that can contain, or store a program for use by or in connection with an instruction execution system, apparatus, or device.

The hardware adapters (135, 140) in the data mining device (105) enable the processor (125) to interface with various other hardware elements, external and internal to the data mining device (105). For example, peripheral device adapters (135) may provide an interface to input/output devices, such as, for example, output device (150), a keyboard, a mouse, a display device, or external memory devices to create a user interface and/or access external sources of memory storage. As will be discussed below, a number of output devices (150) may be provided to allow a user to interact with the data mining device (105), and select and extract portions of text from a forum (110) or the online text database (117). For example, the output device (150) may be a display for displaying a user interface for the data mining device (105). In another example, the output device (150) may be a printer for printing information processed by the data mining device (105). In still another example, the output device (150) may be an external data storage device for storing data associated with an author's text found within a forum (110) or within the online text database (117).

The network adapter (140) provides an interface to the network (120), thereby enabling the transmission of data to and receipt of data from other devices on the network (120), including the forum server (115) and online text database (117).

The online text database (117) may be any data storage device that stores portions of text of a number of online forums (110). Generally, the online text database (117) may comprise a computer readable storage medium. For example, the online text database (117) may be, but not limited to, an electronic, magnetic, optical electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. The online text database (117) may, in place of or in conjunction with the data mining device (105), collect and save data associated with an author's text found within a forum (110).

The network (120) comprises two or more computing devices communicatively coupled. For example, the network (120) may include a local area network (LAN), a wide area network (WAN), a virtual private network (VPN), and the Internet, among others.

Figure 2:
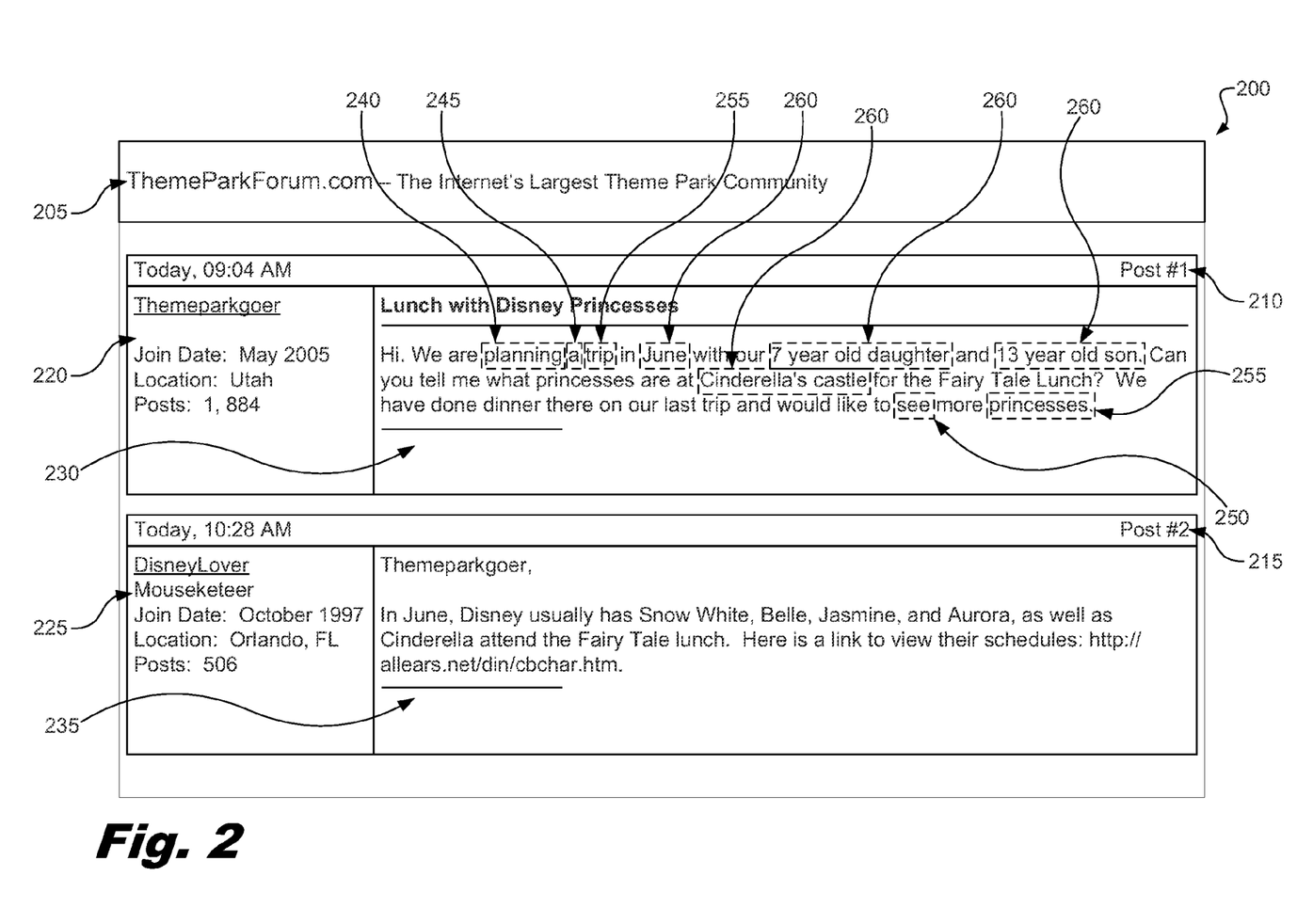
FIG. 2 is a diagram of an online forum including text, according to one example of the principles described herein.

FIG. 2 is a diagram of an online forum (200) including text, according to one example of the principles described herein. As depicted in FIG. 2, the online forum (200) includes a title (205) and a number of posts (210, 215), each post including an author identifier (220, 225) and associated text (230, 235). Post #1 (210), in one example, is the first post within the online forum (200). In this example, because Post #1 (210) is the first post within the forum, the author, "Themeparkgoer," often asks a question or a series of questions within the text (230) that she would like answered by others who interact within the online forum (200). In the example of FIG. 2, Themeparkgoer asks which princesses will be attending a lunch scheduled at a famous theme park, DISNEYLAND RESORT®. Themeparkgoer's text (230) also includes words or statements of intention (230) when she states, "[w]e are planning a trip in June with our 7 year old daughter and 13 year old son," or "would like to see more princesses."

A statement of intention is any word, group of words, or phrases that mark that there is an intention by an author of the text to perform an action. Some examples of statements of intention (230) include "would like to see," "are planning a trip," or "thinking about doing," and indicate that the comment is about an intention to perform an action. A statement of intention (230) has different attributes (240, 245, 250, 255, 260). First, the statement of intention is formed by an intention verb (240) and another particle (245) such as, for example, a preposition, or an article. Examples of intention verbs and associated prepositions include, "like to," "planning a," and "thinking about." The intention verb (240) may also be associated with an action verb (250). An action verb (250) is an action intended by the author, such as, for example, "see" in "like to see" as written by the author "Themeparkgoer" of FIG. 2.

The intention verb (240) may also be directly associated with an intention object (255). An intention object (255) is the object of the intention of the author such as, for example, "trip" in "planning a trip," or "princesses" in "would like to see more princesses."

In another example, complementary information (260) is included in the statement of intention (230), and gives details of the intention of the author. In the example of FIG. 2, the complementary information (260) includes: information as to dates such as, for example, "June," number of people participating in the activity such as, for example, approximately 3 or 4 people, demographics of people participating in the activity such as, for example, "7 year old daughter," and "13 year old son," and locations at which the activity is to take place such as, for example, "Cinderella's castle." The manner in which the system (100) of FIG. 1 identifies the statements of intention (230) within online text and extracts a number of attributes (240, 245, 250, 255, 260) of the statements of intention (230) will now be described in FIGS. 3 through 5.

Figure 3:
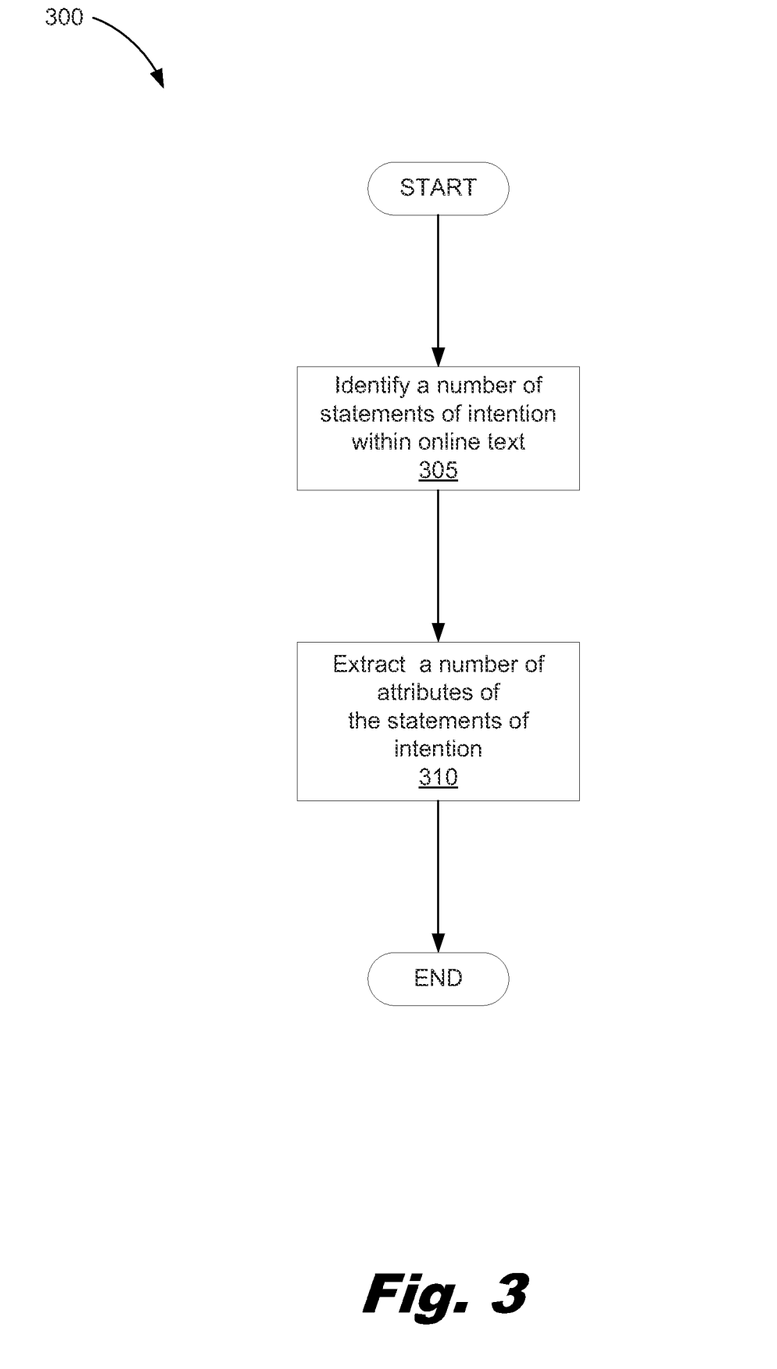
FIG. 3 is a flowchart showing a method of capturing intentions within online text using a data mining device, according to one example of the principles described herein.

FIG. 3 is a flowchart showing a method (300) of capturing intentions within online text using the data mining device (105), according to one example of the principles described herein. The method (300) of FIG. 3 begins with the data mining device (105) identifying (block 305) a number of statements of intention within the text being considered. In the example, of FIG. 2, the text being considered is text (230), and the statements of intention identified by the data mining device (105) are "planning a trip," and "would like to see more princesses."

The method (300) proceeds with the extraction (block 310) of a number of attributes (240, 245, 250, 255, 260) of the statements of intention by the data mining device (105). In the example of FIG. 2, the attributes (240, 245, 250, 255, 260) include the intention verbs (240) and their associated particles (245) "planning a," and "like to." Further, the attributes (240, 245, 250, 255, 260) include the action verb (250) "see" in "like to see." Still further, the attributes in FIG. 2 include intention objects (255) "trip" in "planning a trip," and "princesses" in "would like to see more princesses." Even still further, the attributes of the statement of intention (230) of FIG. 2 include complementary information (260) as indicated above. This information regarding the statement of intention (230) of FIG. 2 may then be compiled as data and transmitted to another computing device for further analysis, compilation, and/or storage, or output to an output device. More details regarding the method of FIG. 3 will now be described in connection with FIG. 4.

Figure 4:
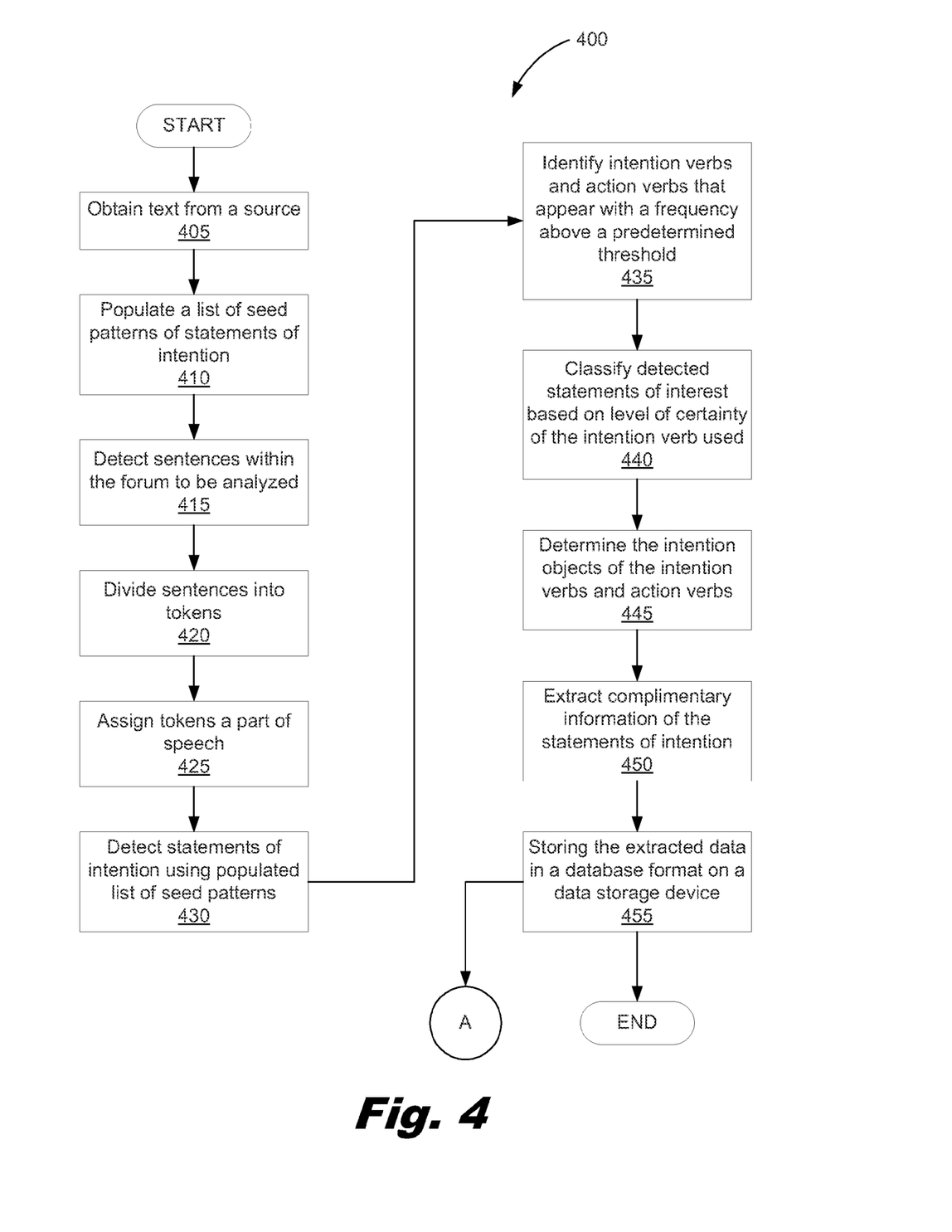
FIG. 4 is a flowchart showing a method of capturing intentions within online text using a data mining device, according to another example of the principles described herein.

FIG. 4 is a flowchart showing a method (400) of capturing intentions within online text using a data mining device (105), according to another example of the principles described herein. The method (400) of FIG. 4 begins by obtaining (block 405) text from a source. In one example, the source of text is the forum (110) located on the forum server (115), and accessible to the data mining device (105) via the network (120). In another example, the source is the online text database (117) accessible to the data mining device (105) via the network (120). In yet another example, the source is the data storage device (130) within the data mining device (105).

After text has been obtained (block 405) from a source, the method (400) proceeds by populating (block 410) a list of seed patterns of statements of intention. The statements of intention written by an author may have the form: [intention verb]+[action verb]+[intention object]. Intention verbs (240) and action verbs (250) are often omitted in natural language when an author expresses her intention. Therefore, to identify statements of intention and their associated action verbs (250), a list of seed patterns of statements of intention is populated (block 410). Some examples of seed patterns of statements of intention are as follows:

1) Verb+Infinitives: <verb> <TO> <verb> (e.g., "We want to visit Teppan Edo at Epcot, but our son has a peanut allergy.")
2) Verb Pairs+Preposition: <verb> <PREPOSITION> <verb> (e.g., "We are thinking of staying at the Fort Wilderness cabins")
3) Only Action Verb: <action_verb> (e.g., "We are going to breakfast at the Cape May our last morning before heading home.")
4) Only Intention Verb: <intention_verb> (e.g., "I am planning a deluxe solo trip for myself and would love to splurge.")

Next, the data mining device (105) detects (block 415) sentences within the forum (110) to be analyzed. The data mining device (105) detects the presence of sentence terminators such as, for example, periods, exclamation marks, and question marks, among others used to split the forum (110) into sentences, in this manner, each sentence within the forum (110) is individually analyzed for the presence of a statement of intention and the various attributes (240, 245, 250, 255, 260) that make up a statement of intention, as will be discussed in more detail below.

After each sentence in the forum (110) is detected (block 415), the sentences are divided (block 420) by the data mining device (105) into tokens. In one example, the division (block 420) of sentences into tokens is performed based on the grammatical and syntax rules of the language of the forum (110) being analyzed. In this example, the manner in which the sentences are divided (block 420) is different between different languages because the grammatical and syntax rules differ from one language to another. Thus, the data mining device (105) divides the sentences into tokens as appropriate for the language of the text.

Next, the tokens are assigned (block 425) a part of speech based on their context within the sentences. In one example, the tokens are assigned as parts of speech within the language of the forum (110) being analyzed. In an example where English is the language of the forum (110) being analyzed, the tokens are assigned as nouns, pronouns, verbs, adverbs, adjectives, prepositions, conjunctions, and interjections, among other English language parts of speech. In another example, the tokens are assigned as intention verbs (240), particles (245) such as articles, prepositions, or conjunctions, action verbs (250), intention objects (255), and complementary information (260).

The method (400) of FIG. 4 then proceeds by detecting (block 430), within the forum (110), statements of intention using the list of seed patterns of statements of intention populated in block 410. In one example, highly frequented intention verbs (240) and action verbs (250) detected at block 430 are used to find other statements of intention within the forum (110). In one example, a forum (110) in which statements of intention are being detected (block 430) may bring about the following example list of detected patterns present in the forum (110) with their respective frequencies:

TABLE 1

Detected statements of interest in order of frequency

| Frequency | Detected Patterns |
| --- | --- |
| 331 | going to be |
| 218 | like to know |
| 159 | want to make |
| 156 | trying to decide |
| 148 | want to go |
| 125 | want to do |
| 125 | have to pay |
| 118 | wanted to know |
| 110 | want to know |
| 101 | want to be |
| 96 | have to be |
| 95 | like to go |
| 92 | need to make |
| 88 | want to take |
| 82 | planning to go |
| 77 | like to have |
| 76 | want to see |
| 73 | take to get |
| 73 | like to take |
| 73 | trying to decide |
| 71 | want to stay |
| 71 | like to stay |
| 70 | want to have |
| 70 | want to get |
| 70 | need to be |
| 67 | like to do |
| 66 | need to bring |
| 65 | planning to visit |
| 64 | planning on going |
| 61 | thinking of going |
| 60 | planning on visiting |
| 58 | planning on staying |
| 57 | planning on taking |

TABLE 1-continued

Detected statements of interest in order of frequency

| Frequency | Detected Patterns |
|---|---|
| 56 | plan on going |
| 53 | thinking of staying |
| 52 | planning on doing |
| 52 | thinking of taking |
| 49 | planning on getting |
| 48 | plan on staying |
| 46 | thinking about going |
| 45 | planning on coming |
| 43 | plan on taking |
| 42 | thinking about taking |
| 40 | thinking about staying |
| 37 | plan on visiting |
| 36 | go about getting |
| 35 | thinking of planning |
| 35 | thinking of doing |
| 32 | thinking about doing |
| 31 | planning on traveling |
| 29 | planning on bringing |
| 27 | thinking of booking |
| 25 | planning on eating |
| 24 | plan on doing |

After detecting (block 430) statements of intention within the forum (110) being analyzed, the data mining device (105) identifies (block 435) the intention verbs (240) and action verbs (250) that appear with a frequency above a predetermined threshold. In the example above, and in considering the detected statements of intention listed in Table 1, the intention verbs (240) appearing with the highest frequency are marked in bold, and the action verbs (250) appearing with the highest frequency are underlined in Table 2 below:

TABLE 2

Intention verbs and action verbs with highest frequency of appearances

| Frequency | Detected Patterns |
|---|---|
| 331 | going to be |
| 218 | like to know |
| 159 | want to make |
| 156 | trying to decide |
| 148 | want to go |
| 125 | want to do |
| 125 | have to pay |
| 118 | wanted to know |
| 110 | want to know |
| 101 | want to be |
| 96 | have to be |
| 95 | like to go |
| 92 | need to make |
| 88 | want to take |
| 82 | planning to go |
| 77 | like to have |
| 76 | want to see |
| 73 | take to get |
| 73 | like to take |
| 73 | trying to decide |
| 71 | want to stay |
| 71 | like to stay |
| 70 | want to have |
| 70 | want to get |
| 70 | need to be |
| 67 | like to do |
| 66 | need to bring |
| 65 | planning to visit |
| 64 | planning on going |
| 61 | thinking of going |
| 60 | planning on visiting |
| 58 | planning on staying |
| 57 | planning on taking |

TABLE 2-continued

Intention verbs and action verbs with highest frequency of appearances

| Frequency | Detected Patterns |
|---|---|
| 56 | plan on going |
| 53 | thinking of staying |
| 52 | planning on doing |
| 52 | thinking of taking |
| 49 | planning on getting |
| 48 | plan on staying |
| 46 | thinking about going |
| 45 | planning on coming |
| 43 | plan on taking |
| 42 | thinking about taking |
| 40 | thinking about staying |
| 37 | plan on visiting |
| 36 | go about getting |
| 35 | thinking of planning |
| 35 | thinking of doing |
| 32 | thinking about doing |
| 31 | planning on traveling |
| 29 | planning on bringing |
| 27 | thinking of booking |
| 25 | planning on eating |
| 24 | plan on doing |

In one example, the level of certainty or ambiguity in the statement of intention is considered, and the above detected statements of interest are classified (block 440) based on level of certainty of the intention verb contained within the individual statements of interest. In this manner, a deeper understanding of the intention expressed in the forum (110) is obtained. For example, the statement of intent, "thinking of going," expresses a weaker intention certainty than the statement of intent, "want to stay."

Next, the sentence structure of the sentences detected in block 415 are again analyzed to determine (block 445) the intention objects (255) of the intention verbs (240) and action verbs (250). In one example, the data mining device (105) utilizes a part of speech tagging method to extract nouns, compound nouns, or noun phrases as the intention objects (255) within the sentence. Determining (block 445) the object of the intention verbs (240) and action verbs (250) provides for a greater understanding of the intention expressed, and, in turn, provides a greater scope of business intelligence by representing what intention objects (255) of the intention verbs (240) and action verbs (250) within the forum (110) are presented at a high frequency, which co-occurrences of action verbs (250) and intention objects (255) are statistically significant, and what comprises the temporal characteristics of the intention objects (255).

In one example, the relationships gathered from determining (block 445) the intention objects (255) of the intention verbs (240) and action verbs (250), are depicted in a diagram and displayed to a user via the output device (150). In one example, the diagram is a bubble diagrams depicting intention objects (255) that are associated with action verbs (250). In this example, an action verb (250) is positioned within a center bubble of the bubble diagram, and the intention objects (255) that are associated with that action verb (250) branch off of the center bubble. Further, in this example, the size of the bubbles associated with the intention objects (255) that branch off from the center action verb (250) bubble indicates the frequency with which a particular intention object (255) is associated with its respective action verb (250); larger sizes of bubbles indicating a relatively higher frequency than relatively smaller sized bubbles.

Turning again to FIG. 4, the method (400) proceeds by extracting (block 450) complementary information (260) of the statements of intention. In one example, different information extractors are utilized by the data mining device (105) to extract different complementary information (260) of the statements of intention. For example, the data mining device (105) utilizes an age extractor to extract ages of people who will be participating in the activity of which the statements of intention describe. In another example, the data mining device (105) utilizes a date extractor to extract dates the statements of intention indicate the action is intended to take place. In yet another example, the data mining device (105) utilizes an extractor that extracts the number of people that are to participate in the activity. In still another example, the data mining device (105) utilizes a venue extractor that extracts the venue that the statements of intention indicate the action is intended to take place.

In one example, the extractors are created manually. In another example, the extractors are created automatically. In an example where an extractor is built manually, the data mining device (105) creates a lookup table with specific words that the data mining device (105) recognizes. For example, for the venue extractor, a list of the venues that the statements of intention indicate the action is to take place, are provided. In this example, the statements of intention are parsed for any instance of a venue included in the list of venues.

In another example where an extractor is built manually, the data mining device (105) creates a number of rules including a number of conditions. In this example, the condition is a pattern that is matched with an expression formed by a number of tokens or generalizations of tokens in the surrounding context of the complementary information (260) to be extracted. For example, for the age extractor, an expression may be "age{s} [num] {,|and [num]}." In this example, the pattern to be matched is the word "age" or "ages" followed by a number and, in one example, a repeating group of commas and/or the word "and" followed by another number. The action part of the rule is the extraction of the numeric parts of the pattern that are, in this example, the ages of the participants.

In an example where an extractor is built automatically, the data mining device (105) applies a rule-based technique where a genetic algorithm is utilized to learn the patterns. In this example, the genetic algorithm includes a population of strings called genotypes that encode candidate solutions called phenotypes to the extraction of complementary information (260) of the statements of intention. These genotypes evolve toward better solutions to the extraction of the complementary information (260) starting from a population of randomly generated phenotypes. In each generation, the fitness of every phenotype in the population is evaluated. Multiple individuals are stochastically selected from the current population based on their fitness, and modified to form a new population. The new population is then used in the next iteration. The iterations terminate when either a maximum number of generations has been produced, or a satisfactory fitness level has been reached for the population.

In another example where an extractor is built automatically, the data mining device (105) applies statistical analysis. With regard to the above examples of extractors utilized by the data mining device (105), any number of extraction methods or devices may be used either in series or in parallel to extract (block 450) complementary information (260) of the statements of intention.

After extracting (block 450) the complementary information (260) of the statements of intention, the method (400) proceeds by storing (block 455) the extracted data in a database format on a data storage device such as, for example, the hard disk drive (130-3) of the data storage device (130). In another example, the extracted data is stored in a database format in a data storage device separate from the data mining device (105) such as, for example, the online text database (117) or another storage device communicatively coupled to the data mining device (105).

Figure 5:
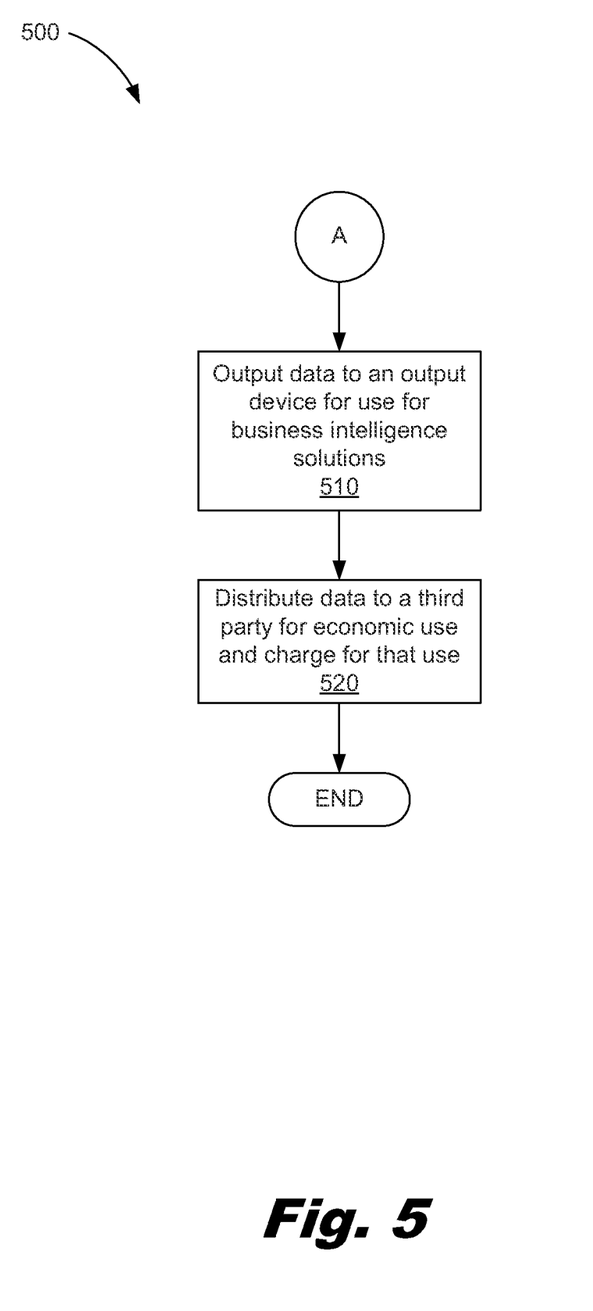
FIG. 5 is a flowchart showing a method of realizing an economic gain from the capture of intentions within online text using a data mining device, according to another example of the principles described herein.

Turning now to FIG. 5, a flowchart showing a method of realizing an economic gain from the capture of intentions within online text using a data mining device, according to another example of the principles described herein, is shown. Following indicator "A" from FIG. 4 to FIG. 5, after complementary information (260) of the statements of intention are extracted (block 450) and stored (block 455) on a data storage device, the data is used (block 510) in connection with a variety of business intelligence solutions and output to the output device (150) for viewing and interaction with a user. In one example, online analytical processing (OLAP) methods are applied in connection with the methods of FIGS. 3 and 4 in applications where a business entity desires reporting for sales, marketing, management reporting, business process management (BPM), budgeting and forecasting, and financial reporting, among others in bringing about an economic gain. In another example, a business entity may utilize the above methods in order to present a particular person or group of people with targeted marketing campaigns. In this example, a business entity may present to a person an advertisement or coupon, for example, in hopes of enticing the individual to go forward with their intended action and bring about an economic gain In one example, a dashboard or other user interface is provided in which a number of intention objects (255) are displayed. In this example, the size of the intention object (255) is proportional to the frequency at which the intention object (255) appears in the forum (110); larger sizes indicating a relatively higher frequency than relatively smaller sized bubbles. In this manner, the intention objects (255) displayed in the user interface indicate a measure of the importance or interest that people have in that intention object (255). In this example, a user seeking to realize an economic gain clicks on an intention object (255) to obtain information about attributes of the intentions involving that intention object (255). In this manner, the user can understand how to present a marketing campaign to a number of people.

In another example, pie charts are used to display ages, number of people participating, months in which the comments on the forum (110) were written, and other complementary information (260) in connection with an intended visit to a particular place. In yet another example, dashboards or other user interfaces including ad-hoc querying capabilities are built upon the data relating to the extracted complementary information (260) of the statements of intention for quick and easy retrieval of information.

Turning again to FIG. 5, the method (500) proceeds by distributing (block 520) to a third party the data representing the extracted attributes (240, 245, 250, 255, 260) of the statements of intention for an economic use, and charging the third party for access to or use of the data. As stated above, knowing the intentions of a consumer can give any business entity an advantage in the marketplace. Thus, in block 520, the data may be utilized by a third party business entity within commerce to provide better products and services to consumers, enhance customer relations, create personalized target marketing, systems design, resource planning, and, in general, capitalize on an understanding of consumers' intentions. Knowing consumer intentions allows for a company to remain competitive or obtain a competitive edge within commerce. Thus, a third party benefits economically from the use of and access to data representing the extracted attributes (240, 245, 250, 255, 260) of the statements of intention found in an inline forum (110). In another example, the data representing the extracted attributes (240, 245, 250, 255, 260) of the statements of intention are sold to the third party so that the party who performs the above methods of FIGS. 3, 4, and 5 may also realize an economic gain as well. In this manner, the data becomes a commodity within the marketplace.

The above methods of FIGS. 3 through 5 may be applied in connection with online forums (110) that are written in different languages such as, for example, French, German, Japanese, or Spanish, among many other languages. In this example, the data mining device (105) parses the online forum (110) with a parser that identifies parts of speech in that different language or languages. Further, the data mining device (105) includes a dictionary for the language that the online forum (110) is written that identifies these different parts of speech according to the grammar and syntax of that language.

The methods described above may be accomplished in conjunction with a computer program product comprising a computer readable medium having computer usable program code embodied therewith that, when executed by a processor, performs the above methods. Specifically, the computer program product identifies a number of statements of intention within an online forum, and extracts a number of attributes from the statements of intention.

The specification and figures describe methods and systems for capturing intentions within online text. A data mining device identifies a number of statements of intention within an online forum, and extracts a number of attributes from the statements of intention. This capture of intentions within online text may have a number of advantages, including: 1) realization of economic benefits from access to consumer information not previously obtainable; 2) ability to sell information about a consumer's intentions to a third party as a commodity in the marketplace; 3) the ability to analyzing large amounts of online text within online forums describing people's intentions automatically and rapidly to extract the intentions along with theft characterization; 4) provides to business entities a quick actionable insight into what people are intending to do in connection with that business entities market; and 5) providing for targeting marketing to individual's whose intentions are extracted from the online forums, among others.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of capturing intentions within online text comprising:
with a data mining device, identifying, via a processor, a plurality of statements of intention within an online forum, wherein each statement of intention is a statement by an author in the online forum, and wherein the statement is indicative of an intent to perform an action, wherein the identifying comprises:
populating a list of seed patterns of the statements of intention,
detecting a plurality of sentences within the online forum;
for each sentence detected within the online forum, dividing the sentences into a plurality of tokens;
assigning each of the tokens a part of speech;
and detecting a plurality of statements of intention using the list of seed patterns; and
with the data mining device, extracting, via the processor, a plurality of attributes from the statements of intention.

2. The method of claim 1, in which identifying a plurality of statements of intention within the online forum further comprises:
identifying a plurality of intention verbs and a plurality of action verbs within the statements of interest; and
determining a plurality of intention objects associated with the intention verbs and action verbs.

3. The method of claim 1; further comprising extracting complimentary information from the statements of intention.

4. The method of claim 1, further comprising storing data representing the attributes extracted from the statements of intention in a data storage device.

5. The method of claim 1, further comprising classifying detected statements of interest based on a level of certainty of the intention verb contained within the statements of interest.

6. The method of claim 1, further comprising outputting data representing the attributes extracted from the statements of intention to an output device.

7. The method of claim 1, in which extracting a plurality of attributes from the statements of intention comprises extracting a plurality of intention verbs, a plurality of action verbs, and a plurality of intention objects from the statements of intention.

8. The method of claim 1, further comprising obtaining text from a source.

9. A system for extracting intentions expressed within an online forum comprising:
a data mining device;
a forum server comprising a plurality of online forums communicatively coupled to the data mining device,
in which the data mining device identifies, via a processor, a plurality of statements of intention within the online forums and extracts, via the processor, a plurality of attributes from the statements of intention, wherein each statement of intention is a statement by an author in the online forum, wherein the statement is indicative of an intent to perform an action, and wherein the plurality of statements are identified by:
populating a list of seed patterns of the statements of intention;
detecting a plurality of sentences within the online forum;
for each sentence detected within the online forum, dividing the sentences into a plurality of tokens;
assigning each of the tokens a part of speech;
and detecting a plurality of statements of intention using the list of seed patterns.

10. The system of claim 9, further comprising an online text database communicatively coupled to the data mining device via the network that stores portions of text of a plurality of online forums,
in which the data mining device identifies a plurality of statements of intention within the online forums stored in the online text database, and extracts a plurality of attributes from the statements of intention.

11. The system of claim 9, further comprising an output device that displays data representing the attributes extracted from the statements of intention.

12. The system of claim 9, in which the forum server is communicatively coupled to the data mining device via a network.

13. A method of realizing an economic gain from the capture of intentions within online text comprising:

outputting, via a processor, data representing attributes extracted from statements of intention within online forums to a business entity, wherein each statement of intention is a statement by an author in the online forum, wherein the statement is indicative of an intent to perform an action, and wherein the statements are identified by:

populating a list of seed patterns of statements of intention;

detecting a plurality of sentences within the online forums;

for each sentence detected within the online forums, dividing the sentences into a plurality of tokens;

assigning each of the tokens a part of speech;

and detecting a plurality of statements of intention using the list of seed patterns; and charging, via the processor, the business entity for access to the data representing the attributes extracted from the statements of intention.

14. The method of claim 13, in which the data representing the attributes extracted from the statements of intention is presented to the business entity within a graphical user interface.

\* \* \* \* \*